United States Patent
Cogswell et al.

(10) Patent No.: US 10,613,312 B2
(45) Date of Patent: Apr. 7, 2020

(54) SCANNING IMAGING FOR ENCODED PSF IDENTIFICATION AND LIGHT FIELD IMAGING

(71) Applicant: The Regents of the University of Colorado, a body corporate, Denver, CO (US)

(72) Inventors: Carol J. Cogswell, Boulder, CO (US); Robert H. Cormack, Erie, CO (US)

(73) Assignee: The Regents of the University of Colorado, a body, Denver, CO (US)

( * ) Notice: Subject to any disclaimer, the term of this patent is extended or adjusted under 35 U.S.C. 154(b) by 488 days.

(21) Appl. No.: 15/290,534

(22) Filed: Oct. 11, 2016

(65) Prior Publication Data
US 2017/0031151 A1 Feb. 2, 2017

Related U.S. Application Data

(63) Continuation of application No. PCT/US2015/025599, filed on Apr. 13, 2015.
(Continued)

(51) Int. Cl.
| | |
|---|---|
| H04N 13/218 | (2018.01) |
| G02B 21/36 | (2006.01) |
| H04N 13/271 | (2018.01) |
| G02B 21/00 | (2006.01) |
| H04N 5/225 | (2006.01) |

(52) U.S. Cl.
CPC ......... *G02B 21/367* (2013.01); *G02B 21/008* (2013.01); *H04N 5/2256* (2013.01); *H04N 13/218* (2018.05); *H04N 13/271* (2018.05)

(58) Field of Classification Search
CPC ........................... G02B 21/367; H04N 13/271
See application file for complete search history.

(56) References Cited

U.S. PATENT DOCUMENTS

| | | | | |
|---|---|---|---|---|
| 6,248,988 B1 * | 6/2001 | Krantz | ............... | G02B 21/004 250/201.3 |
| 7,126,151 B2 * | 10/2006 | Estes | ..................... | B82Y 10/00 257/25 |
| 7,705,970 B2 * | 4/2010 | Piestun | .................... | G01C 3/08 356/4.01 |

(Continued)

*Primary Examiner* — Irfan Habib
(74) *Attorney, Agent, or Firm* — Macheledt Bales LLP; Jennifer L. Bales

(57) ABSTRACT

Scanned illumination allows for capturing 3-dimensional information about an object. A conventional reflection (or transmission) bright field (or fluorescence, darkfield, polarizing, phase contrast or interference) microscope is configured to use laterally scanned illumination (for example by moving an array in front of the light source) to scan an extended object. A pixelated detector may capture a series of images at the exit pupil of a microscope objective, and this series of images may be processed to form a Light Field image of the object. Or, a microscope is configured to provide scanned illumination to an extended object, while applying extended depth of field and 3D depth localization encoding to the resulting set of images. Thus multiple encoded images are generated. These images are decoded and combined, with custom digital signal processing algorithms, to form a 3D volume rendering or animation. Each point in the specimen is illuminated separately from its neighbors, and records its distinct PSF signature without any ambiguity arising from adjacent points on the object.

5 Claims, 10 Drawing Sheets

Related U.S. Application Data

(60) Provisional application No. 61/978,588, filed on Apr. 11, 2014.

(56) References Cited

U.S. PATENT DOCUMENTS

| | | | | |
|---|---|---|---|---|
| 8,831,367 | B2* | 9/2014 | Venkataraman | H04N 13/128 |
| | | | | 382/233 |
| 9,325,971 | B2* | 4/2016 | Cogswell | H04N 13/271 |
| 9,438,888 | B2* | 9/2016 | Venkataraman | G01P 3/38 |
| 9,519,972 | B2* | 12/2016 | Venkataraman | G06T 7/557 |
| 9,741,118 | B2* | 8/2017 | Mullis | G06T 7/80 |
| 9,888,194 | B2* | 2/2018 | Duparre | B82Y 30/00 |
| 9,967,541 | B2* | 5/2018 | Piestun | H04N 13/204 |
| 10,122,993 | B2* | 11/2018 | Venkataraman | G01P 3/38 |
| 10,136,116 | B2* | 11/2018 | Tosic | H04N 13/128 |
| 10,244,223 | B2* | 3/2019 | Graziosi | H04N 13/111 |
| 10,254,534 | B2* | 4/2019 | Caravaca-Aguirre | |
| | | | | G02B 23/2469 |
| 10,371,932 | B2* | 8/2019 | Singer | G02B 21/025 |
| 2007/0052958 | A1* | 3/2007 | Ulrich | G02B 21/0032 |
| | | | | 356/318 |
| 2007/0272842 | A1* | 11/2007 | Knebel | G02B 21/0076 |
| | | | | 250/234 |
| 2010/0149315 | A1* | 6/2010 | Qu | A61B 1/00193 |
| | | | | 348/46 |
| 2010/0157771 | A1* | 6/2010 | Ross | G11B 7/0065 |
| | | | | 369/103 |
| 2010/0265385 | A1* | 10/2010 | Knight | H04N 5/232 |
| | | | | 348/340 |
| 2011/0170391 | A1* | 7/2011 | Ross | G11B 7/083 |
| | | | | 369/53.26 |
| 2011/0205552 | A1* | 8/2011 | Bendall | G01B 11/25 |
| | | | | 356/606 |
| 2011/0237892 | A1* | 9/2011 | Tearney | A61B 5/0062 |
| | | | | 600/160 |
| 2012/0051084 | A1* | 3/2012 | Yalin | G02B 6/028 |
| | | | | 362/553 |
| 2012/0320438 | A1* | 12/2012 | Knebel | G02B 21/0032 |
| | | | | 359/205.1 |
| 2014/0071238 | A1* | 3/2014 | Mertens | A61B 1/07 |
| | | | | 348/45 |
| 2014/0146376 | A1* | 5/2014 | Kleppe | G02B 21/0048 |
| | | | | 359/212.1 |
| 2015/0192461 | A1* | 7/2015 | Chen | G02B 21/0032 |
| | | | | 356/366 |
| 2016/0327779 | A1* | 11/2016 | Hillman | G02B 21/367 |
| 2016/0356746 | A1* | 12/2016 | Piestun | A61B 5/0095 |
| 2017/0105618 | A1* | 4/2017 | Schmoll | A61B 3/1025 |

* cited by examiner

SCANNING IMAGING FOR ENCODED PSF IDENTIFICATION AND LIGHT FIELD IMAGING

BACKGROUND OF THE INVENTION

Field of the Invention

The present invention relates to scanned illumination and imaging. In particular, the present invention utilizes a microscope with scanned illumination for encoded PSF identification to accomplish depth map 3D imaging of extended objects, or for Light Field imaging of complex objects.

Discussion of Related Art

Existing 3D microscope technologies have limitations. Simply stated, all microscope designs are driven by the fundamental laws of physics, and specifically designed to address the tradeoffs that arise when designing lenses for high-resolution imaging. A short description of these optical tradeoffs and examples of microscope technologies that have been developed to overcome them are as follows:

(1) High numerical aperture (NA) objectives have a very shallow depth of field (DOF) which results in biological features outside the best focus plane appearing blurred. Confocal and widefield deconvolution microscopes overcome this problem by recording a multi-focal stack of images at each experimental time point. This process is slow; it increases the potential for fluorescence bleaching or photodamage to cells; it requires frequent alignment and it necessitates extensive user training. But perhaps most significant is confocal microscopes are cost-prohibitive and therefore inaccessible to many biologists.

(2) Microscope images are two-dimensional and even if the objective lens DOF is great enough for all features to appear sharp their precise depth position information is lost. Multi-focal stack microscopes can cover the entire cell thickness but cannot super-localize features in depth to an accuracy greater than the objective DOF. Again, these systems are slow and ineffective for such applications as tracking fast-moving particles or microorganisms throughout the cell volume. Other techniques for super-localizing objects in z, such as rotating PSFs, only work for isolated (sparse) point-like objects.

All prior art methods of PSF encoding for depth information result in PSFs that cannot be deconvolved from an extended object because they are not orthogonal. Therefore, they are limited to point source objects that that are a very small subset of microscopy applications.

(3) 3D imaging using transmission brightfield or phase imaging modes, such as differential interference contrast (DIC), is not possible with any existing confocal or deconvolution widefield technology (they work only in fluorescence). Newly developed Light Field 3D transmission microscopes are reaching the marketplace but they suffer from a loss in lateral resolution.

(4) Finally, super-resolution systems such as PALM, STORM, and STED are slow and address only specially prepared fluorescence samples. Structured illumination techniques for doubling lateral resolution are also slow and not designed for high-speed 3D imaging. The proposed new microscope system will not attempt super-resolution imaging but instead will focus on solutions for the first three optical tradeoffs listed above, which in itself will be a major achievement if successful.

"Light Field" photography refers to cameras able to capture enough information about an object that the resulting image can be 're-focused' later. The information captured is called the "Light Field" (note the term 4D Light Field is often used in the literature, but will not be used herein to avoid confusion, as in expanded point information content (EPIC) microscopes described herein where the $4^{th}$ dimension is time). It refers to systems capable of recording both the position of a ray from an object and its direction. Such a system stores enough information so that a processor can later extend rays to other calculated image planes to essentially refocus the image at another plane within the object. The light field capture concept would seem to be of great interest to microscopists, as it would allow post-capture exploration of the depth details of the object. The extreme loss of resolution, however, has prevented the technique from being used as more than just a demonstration.

A need remains in the art for scanned illumination systems for encoded PSF identification to accomplish depth map 3D imaging of extended objects, or for Light Field imaging of complex objects.

SUMMARY OF THE INVENTION

It is an object of the present invention to provide scanned illumination systems for encoded PSF identification to accomplish depth map 3D imaging of extended objects, or for Light Field imaging of complex objects.

All prior art methods of PSF encoding for depth information result in PSFs that cannot be deconvolved from an extended object because they are not orthogonal. Therefore, they are limited to point source objects that that are a very small subset of microscopy applications. Scanning allows the use of various existing encoding schemes on extended objects.

In an embodiment of the present invention, a microscope is configured to provide scanned illumination to an extended object, to capture the entire Light Field of the object over the scan. A pixelated detector (e.g. a 5×5 or 10×10 photodiode array readable at thousands of frames/second) images the exit pupil of the microscope objective. The object is illuminated by a scanned spot (or set of spots) of light. A series of images is generated. Computations generate a Light Field image of the entire 3D object. Later, a processor can use the Light Field image to "refocus" anywhere within the image.

In another embodiment of the present invention, a microscope is configured to provide scanned illumination to an extended object, while applying extended depth of field and 3D depth localization encoding to the resulting set of images. A conventional reflection (or transmission) bright field (or fluorescence, darkfield, polarizing, phase contrast or interference) microscope is configured to use laterally scanned illumination (for example by moving an array in front of the light source) to scan an extended object and also uses a specially designed phase plate for encoding images. Thus multiple encoded images are generated. These images are decoded and combined, with custom digital signal processing algorithms, to form a 3D volume rendering or animation. Each point in the specimen is illuminated separately from its neighbors, and records its distinct PSF ring diameter without any ambiguity arising from adjacent points on the object. This avoids the problem of deconvolving non-orthogonal PSFs mentioned above. Many spots on the sample are illuminated and imaged at the same time, in a single camera frame, as a small number of pixels separate the centers of each PSF ring so they can be readily differentiated. Therefore, the proposed patterned illumination array achieves the necessary separation of the ring PSFs for accurate depth localization of each cell feature while maintaining the required acquisition speed.

The result of the above scanned illumination and encoded detection methods is that the singular PSF corresponding to each position on the object is detected by itself. This allows extended objects to be analyzed by the encoding PSF camera as if each point were separate from all other points.

The present invention allows 3D animations of many subcellular events that occur too rapidly for existing confocal-like microscopes to capture.

In some embodiments, a patterned array is placed in front of the fluorescence or white light source and rapidly scanned (i.e. dithered in x and y) to produce distinct, non-overlapping illumination points in the sample. The patterned array might comprise an array of lenses or a mask with an array of holes, and might be dithered using an x-y piezo scanning stage.

Another embodiment adds an optical phase plate after the scanned illumination. This optical phase plate produces an elongated illumination pattern in the z-dimension (e.g. an array of Bessel beams), thus generating extended depth of field illumination. This is similar to the array of pencil beams as shown in FIG. 8. A Bessel beam (i.e., from an axicon) is not really a pencil, but has a 'pencil' of high intensity in its core for a long ways (compared to the diffractive spreading of a collimated beam of similar diameter).

An object (such as in a microscope) is illuminated sequentially by a focused spot. Alternatively, an array of separated focused spots may be sub-scanned to cover the entire object. Such array of spots may be in diverse geometric arrangements, for example a rectangular array of spots, spaced such that the individual detected PSFs in the camera are physically separated. Another example is a structured array of spots—such structure allowing the individual PSFs to be extracted from each image in the scan. Structuring may be a non-redundant array of spots; i.e., the spacing between each pair of spots is unique; or a uniformly-redundant array (URA) of spots; i.e., the spacing between each pair of spots is repeated exactly N times, N being a prime number. Another example utilizes a pixelated liquid crystal spatial light modulator (SLM) to create a three-dimensional array of focused spots (i.e. separated in x, y, and z) if the sample thickness variations require z-focusing capabilities.

Scanning illumination may also be provided by a digital light processor (aka a light engine) or by an array of deformable mirrors.

Each position in the scan (whether illuminated by a single spot or multiple spots) is captured by a camera that uses a phase plate which modifies the amplitude, phase, or both of the incoming light in the pupil plane. The goal of the phase plate is to provide a PSF which changes shape (or size or orientation) with defocus so that the z-position of each scanned object feature point may be determined by the particular PSF at each scan point. Examples include PSFs which are circles whose diameter encodes the z-position of the illuminated spot, such as is created by a circular caustic phase plate or an Axicon phase plate (or lens). Another example is PSFs which consist of two or more points which rotate as the z-position of the illuminated spot changes. An example is the rotating PSF created by a holographic phase plate.

For a system with scanned illumination, the MTF of the reconstructed image is entirely dependent on the MTF of the focused illumination spot, and is independent of the MTF of the encoded PSF in the recording camera.

Similar scanning illumination systems are well established in biological microscopy, such as in confocal beam scanning or Nipkow disk confocal instruments. This invention differs in that there is no pinhole in front of the detector to eliminate the light from out-of-focus PSFs. In addition, there is no need to record a multi-focal "stack" of images in order to obtain depth information. Instead, in this invention, the full area of the encoded PSF from each point on a complex extended object is imaged sequentially onto a camera. This information is then digitally processed to retrieve depth location and visualize sharply focused features throughout the 3D volume without having to change the focus setting of the microscope.

Finally, in some implementations of engineered PSFs, (such as in pending patent application Ser. No. 13/829,541 filed Mar. 14, 2013 and entitled "Engineered Point Spread Function for Simultaneous Extended Depth of Field and 3D Ranging", incorporated herein by reference), each scanned encoded PSF may contain all of the information needed to reconstruct a sharp image of each feature of the original object and precisely measure its position in all three dimensions. This is possible because (1) the x-y location of the illuminated point in the object can be obtained to nano-precision accuracy (using currently available scanning mechanisms), (2) the z-location of the illuminated object point can be precisely determined by the diameter of the PSF ring image (or other shape or size or orientation change dependent of focal depth), and (3) the relative brightness of the object feature can be determined from the average intensity of the PSF image. Furthermore, most noise artifacts that are common problems in microscope imaging can be readily identified and removed from the PSF image due to their not having the characteristic ring shape of the encoded signal PSF.

This can also be used for multi-photon imaging to give super localization in 3D.

DETAILED DESCRIPTION OF THE INVENTION

Figure 1A:
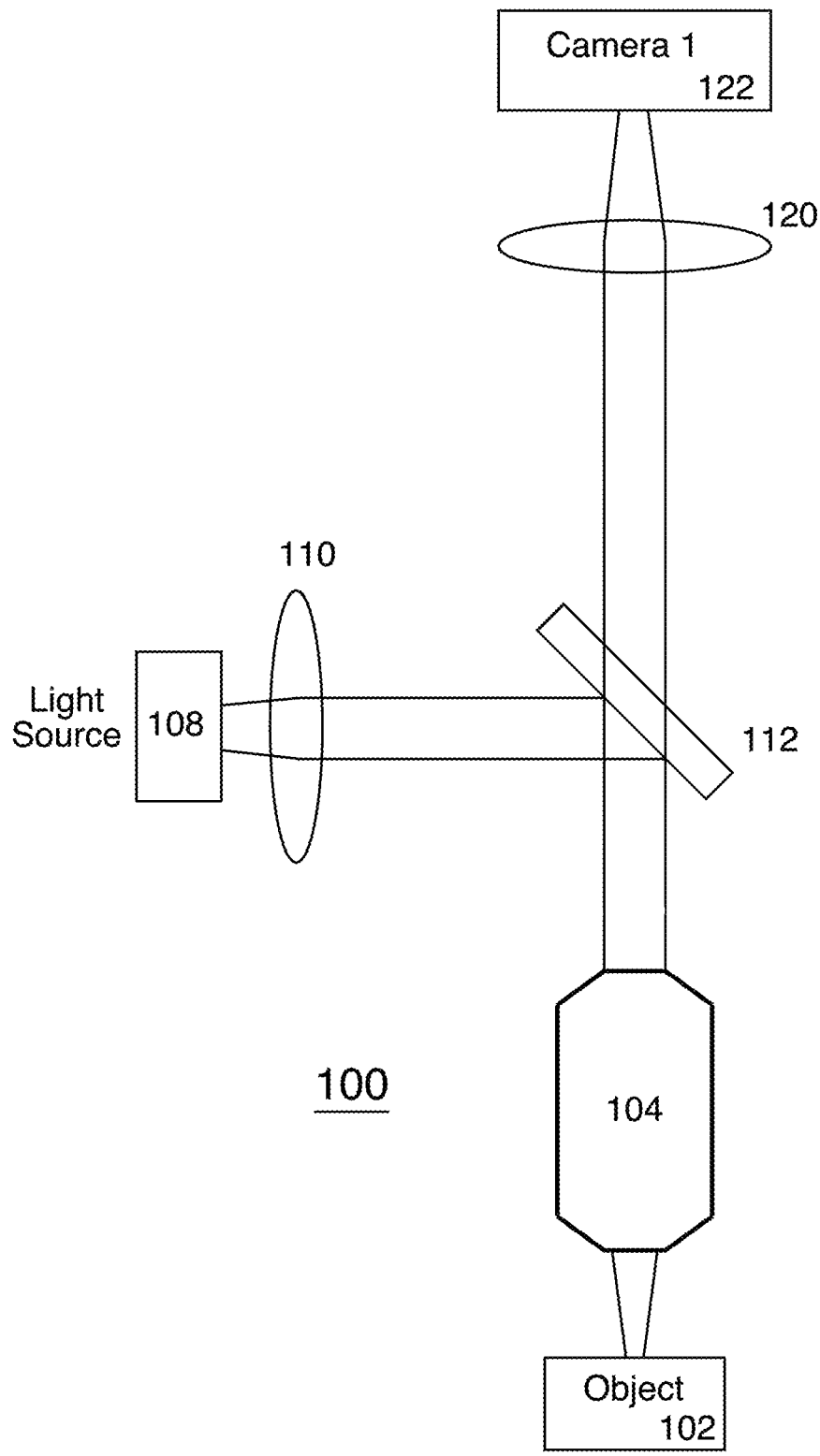
FIG. 1A (Prior Art) is a schematic block diagram illustrating a conventional reflection bright field (fluorescence or any other mode) microscope.

FIG. 1A (Prior Art) is a schematic block diagram illustrating a conventional reflection bright field microscope 100. Object 102 (e.g. a sample containing elements at various depths) is imaged by camera 122 and/or viewed by a user (not shown). Illumination is provided by light source 108. Optical elements include objective lens 104, lenses 110 and 120, and beam splitter 112. Conventional microscopes are capable of discerning tiny objects, but objects are only in focus over a very narrow depth of field.

Figure 1B:
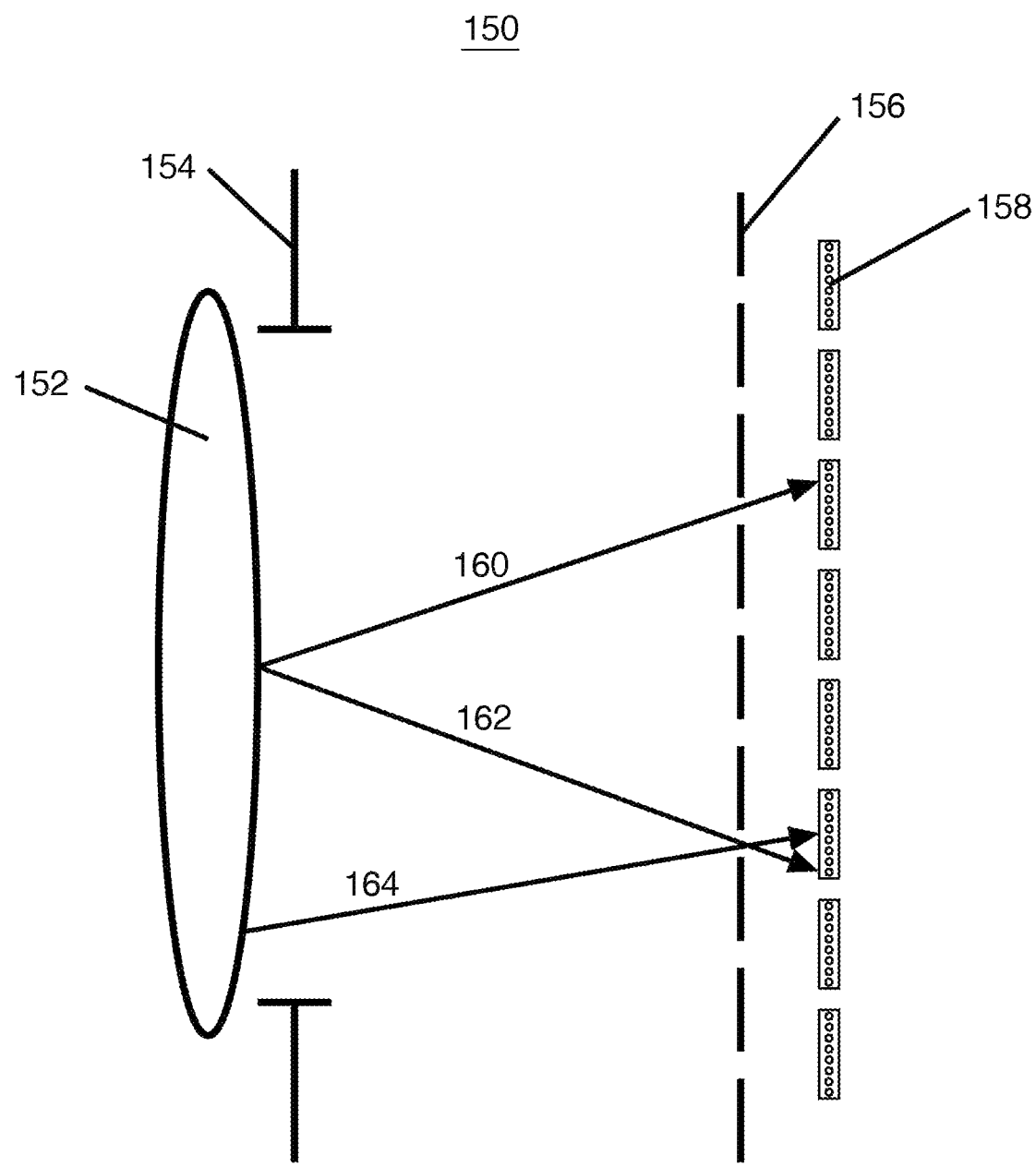
FIG. 1B (Prior Art) is a schematic block diagram illustrating a conventional Light Field imaging system with a pinhole array.

FIG. 1B (Prior Art) is a schematic block diagram illustrating a conventional Light Field imaging system 150 with a pinhole array 156 between lens 152 and pixel array 158. Aperture 154 forms the exit pupil of lens 152. Because of pinhole array 156, a specific pixel within pixel array 158 can be labeled in both position on the exit pupil and direction of ray travel. Rays 160 and 162 come from the same point on the exit pupil, but arrive at different pixels in pixel array 158. Ray 164 hits a pixel near to, but separate from, that hit by ray 162. The resolution of system 150 is the resolution of pinhole array 156, not the resolution of pixel array 158.

Figure 2A:
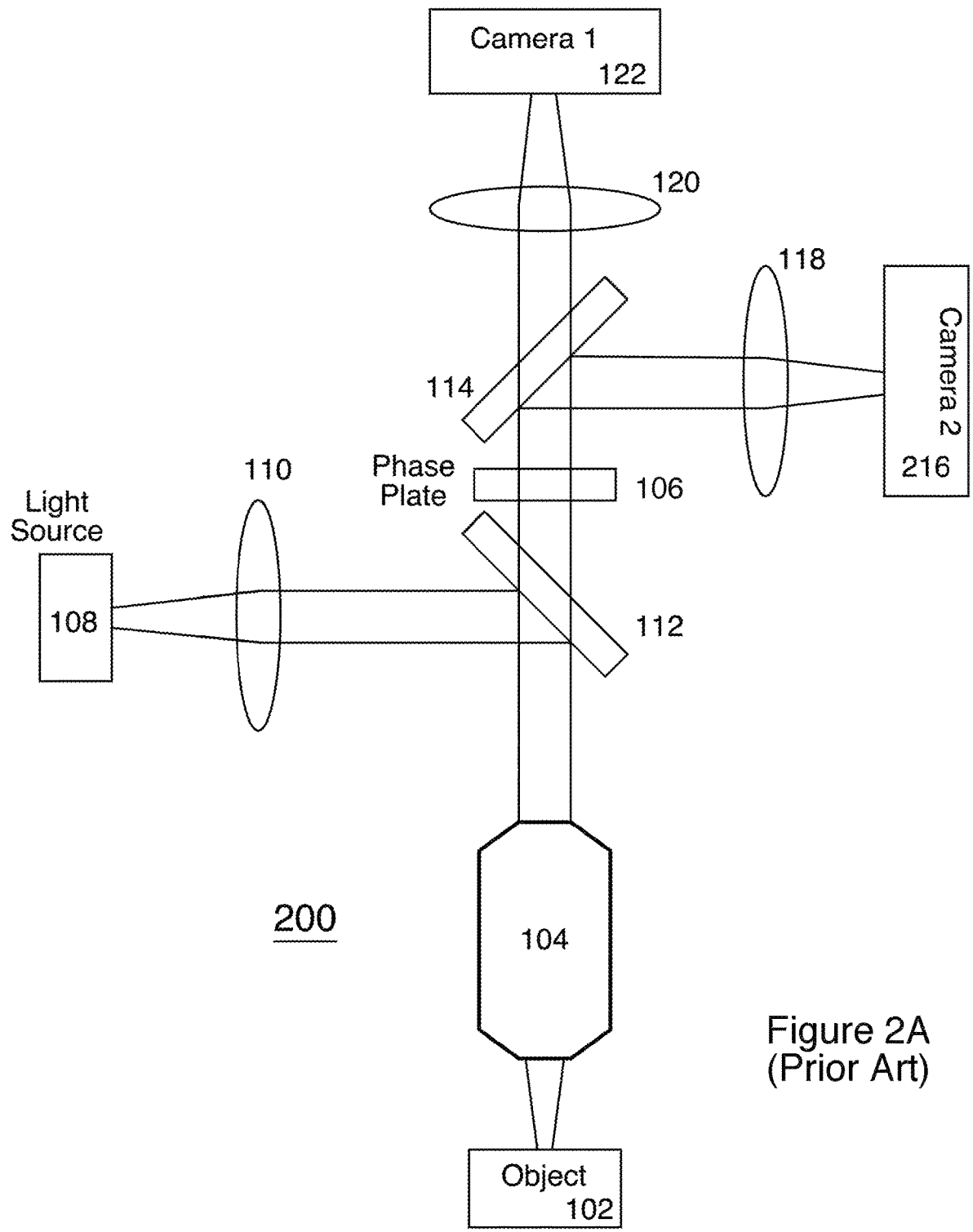
FIG. 2A (Prior Art) is a schematic block diagram illustrating a two-camera expanded point information content (EPIC) microscope.

FIG. 2A (Prior Art) is a schematic block diagram illustrating a two-camera expanded point information content (EPIC) microscope 200. U.S. patent application Ser. No. 13/829,541 describes this system in detail.

Microscope 200 accomplishes extended depth of field and ranging. Apparatus 200 might be a basic compound microscope design, such as microscope 100 of FIG. 1A, with three additions: additional camera 216, phase plate 106 and a beam-splitter 114 for forming two images 126, 128 (see FIG. 2B) at cameras 216 and 122. Note that the term "phase plate" includes mask designs that include both phase and amplitude variations.

Figure 7:
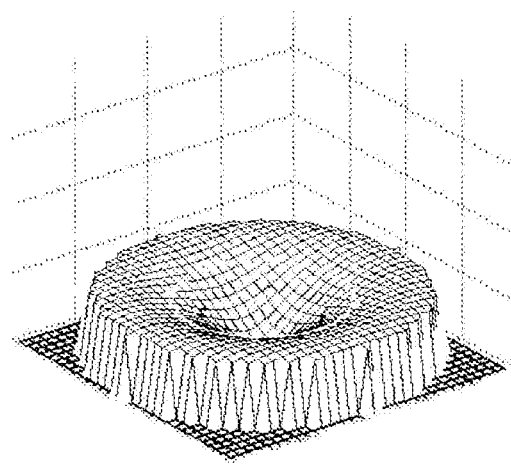
FIG. 7 is a diagram of a custom phase plate insert according to the present invention.

Object 102 might comprise a sample containing elements at various depths. Object 102 is illuminated by light source 108 via lens 110 and beam splitter 112. Light from object 102 is passed through optic 104 and phase plate 106. Phase plate 106 is located (for example) at the back aperture plane of the microscope objective, and causes the image to have a relatively focus invariant point spread function on one side of a plane of best focus, while causing the point spread function shapes to vary with range on the other side of the plane of best focus (for example, points might generate rings whose circumferences vary as a function of range or depth within object 102, see FIGS. 4A-4C). Phase plate 106 might be as shown in FIG. 7 for example.

Next, beam splitter 114 separates the beam so two images (126 and 128 in FIG. 2B) are formed via lenses 118 and 120. Image 126 is used for 3D ranging and is formed at a first plane, for example before the plane of best focus. Image 128 is formed at a second plane, for example beyond the plane of best focus. Image 126 is used to generate a depth map of object 102, and image 128 is used to form an in-focus extended depth of field (EDF) image after processing.

Figure 2B:
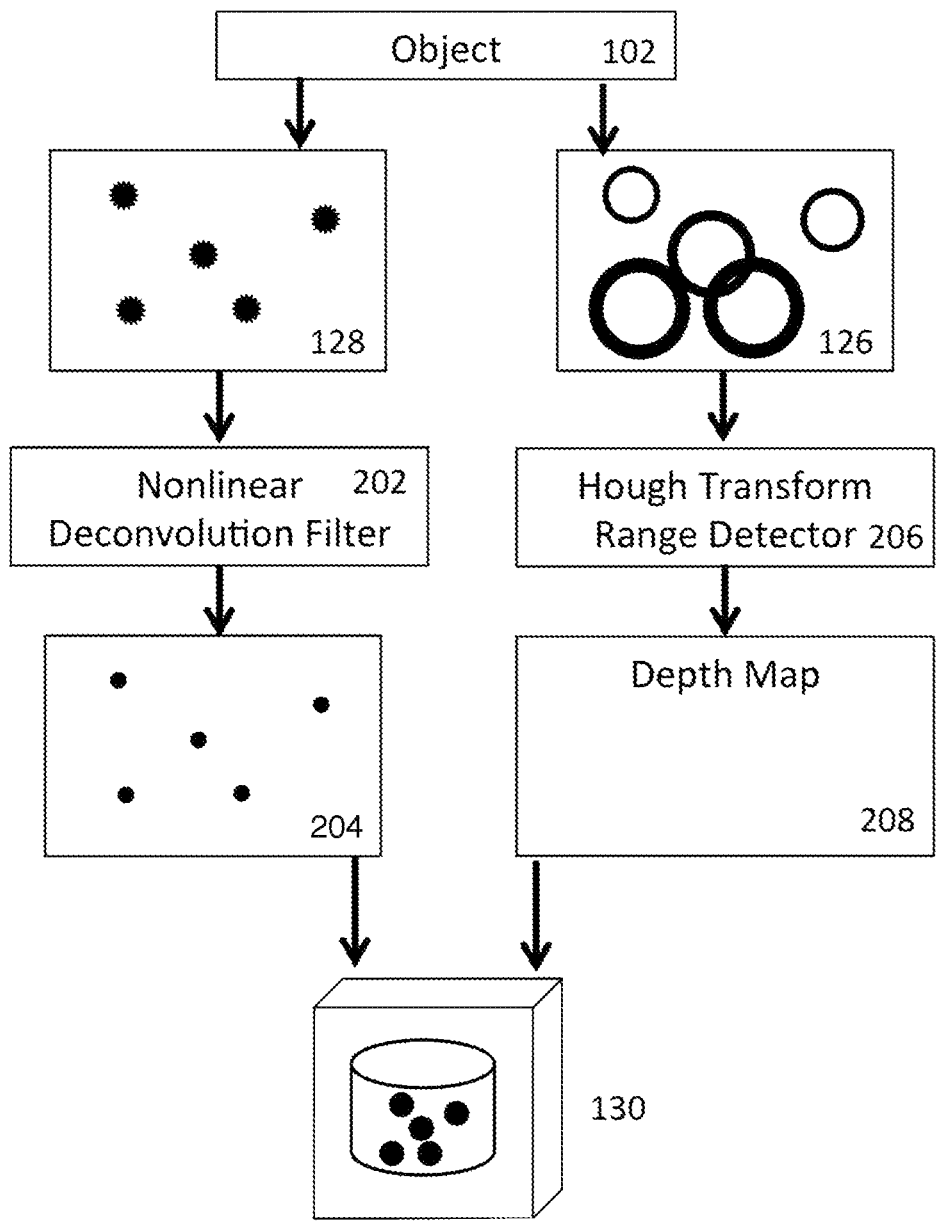
FIG. 2B (Prior Art) is a flow diagram illustrating the imaging and processing steps accomplished by the EPIC system of FIG. 2A.

FIG. 2B (Prior Art) is a flow diagram illustrating the imaging and processing steps accomplished by EPIC microscope 200 of FIG. 2A. FIG. 2B illustrates a method of extending depth of field and ranging according to the present invention. Object 102 is imaged by device 200 as shown in FIG. 2A to form EDF image 128 and depth map image 126.

Image 128 shows fuzzy dots to indicate that the point-spread function of the image is slightly blurred, but relatively invariant for each of the imaged elements, even though they are at various depths within the sample. An image processing algorithm 202 (such as a non-linear deconvolution filter) is applied to remove the blurring pattern, resulting in a high-resolution, extended-depth image 204.

Figure 5:
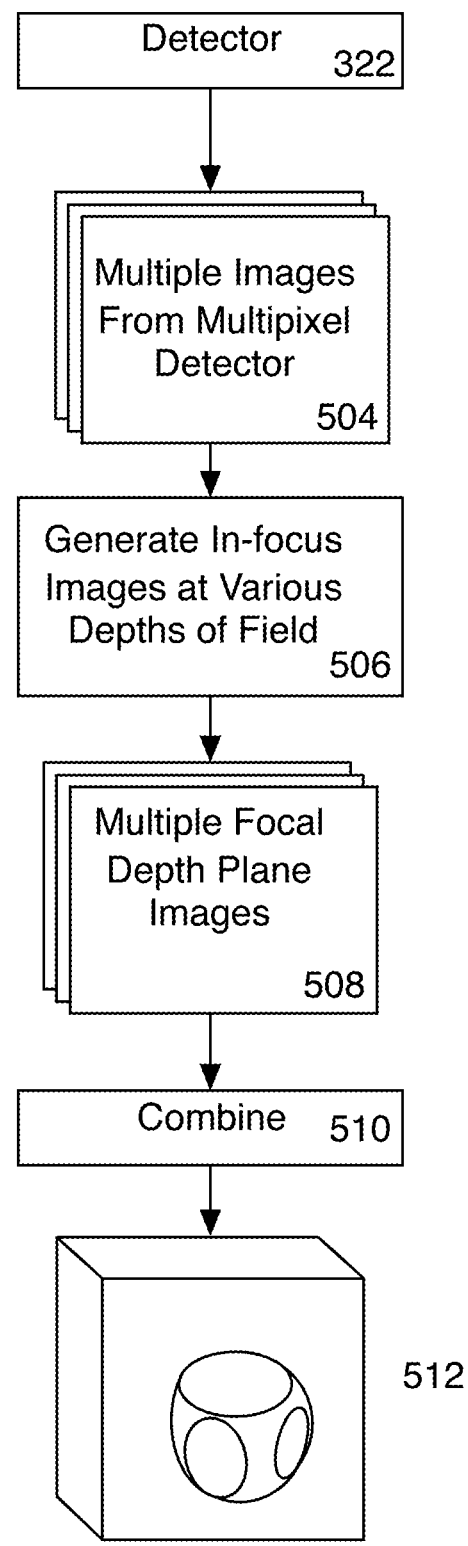
FIG. 5 is a flow diagram illustrating the imaging and processing steps accomplished by an embodiment of the present invention particularly useful for Light Field imaging.

Image 126 shows a series of circles which indicate the depth of each element in object 102. A Hough Transform range-detecting algorithm (for example) may be used to find a range for each object, as shown in FIG. 5. This results in a depth map 208. Extended depth of field image 204 and depth map 208 are generally combined to generate a three-dimensional representation 130 of three-dimensional object 102 (such as a three-dimensional image).

Figure 3A:
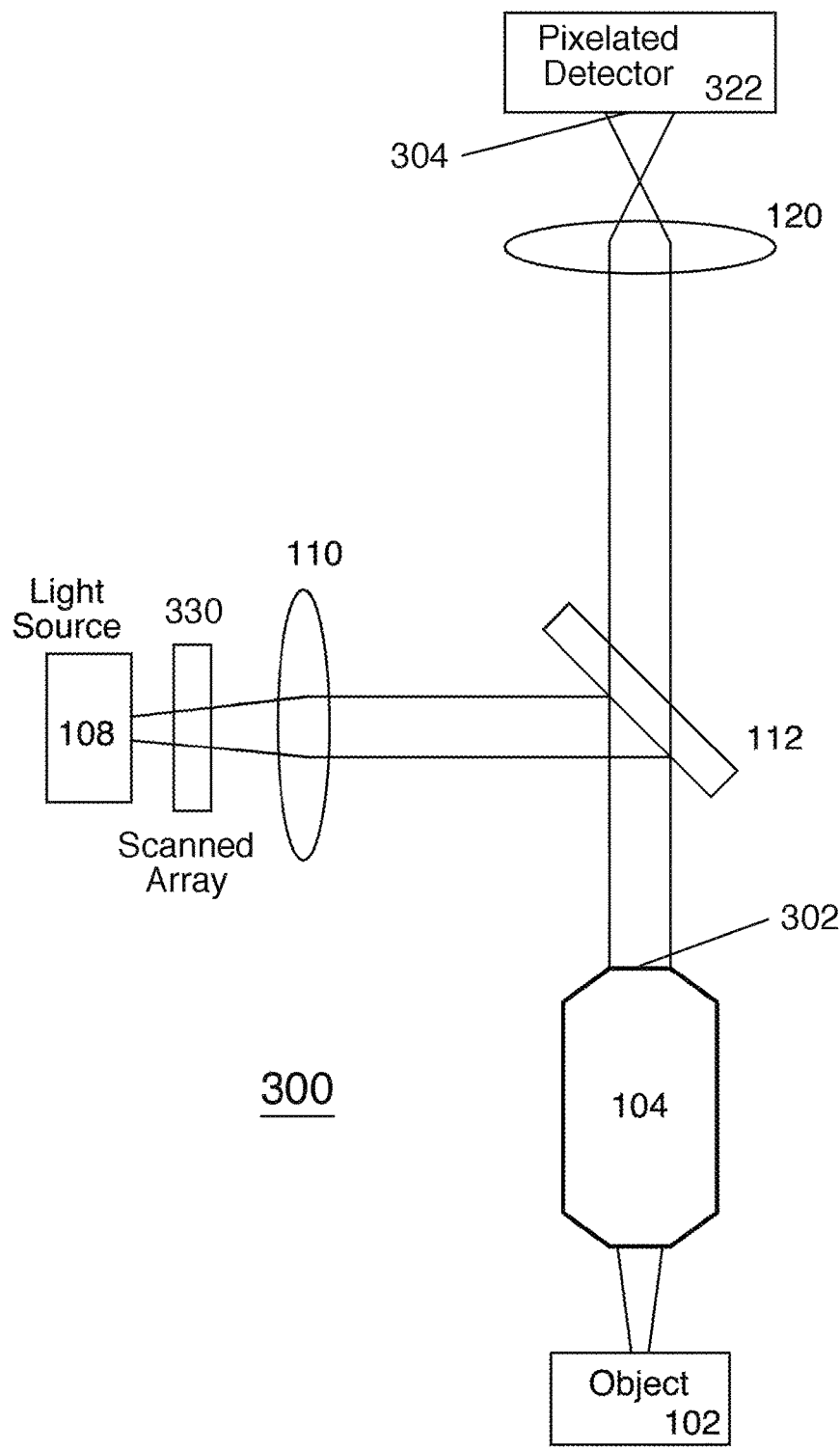
FIG. 3A is a schematic block diagram illustrating a microscope with scanned illumination for Light Field imaging according to the present invention.

FIG. 3A is a schematic block diagram illustrating a Light Field microscope 300 with scanned illumination for Light Field imaging according to the present invention. It does not necessarily include phase plate 106. It is configured to image at exit pupil 302 of optic 104 (rather than imaging object 102). Thus, the image 304 detected by pixelated detector 322 is the image of exit pupil 302. Scanned array element 330 provides scanned illumination to image exit pupil 302, forming multiple images over the scan. Instead of an image at one depth, the entire Light Field is captured over the scan, as shown in FIG. 5.

Figure 3B:
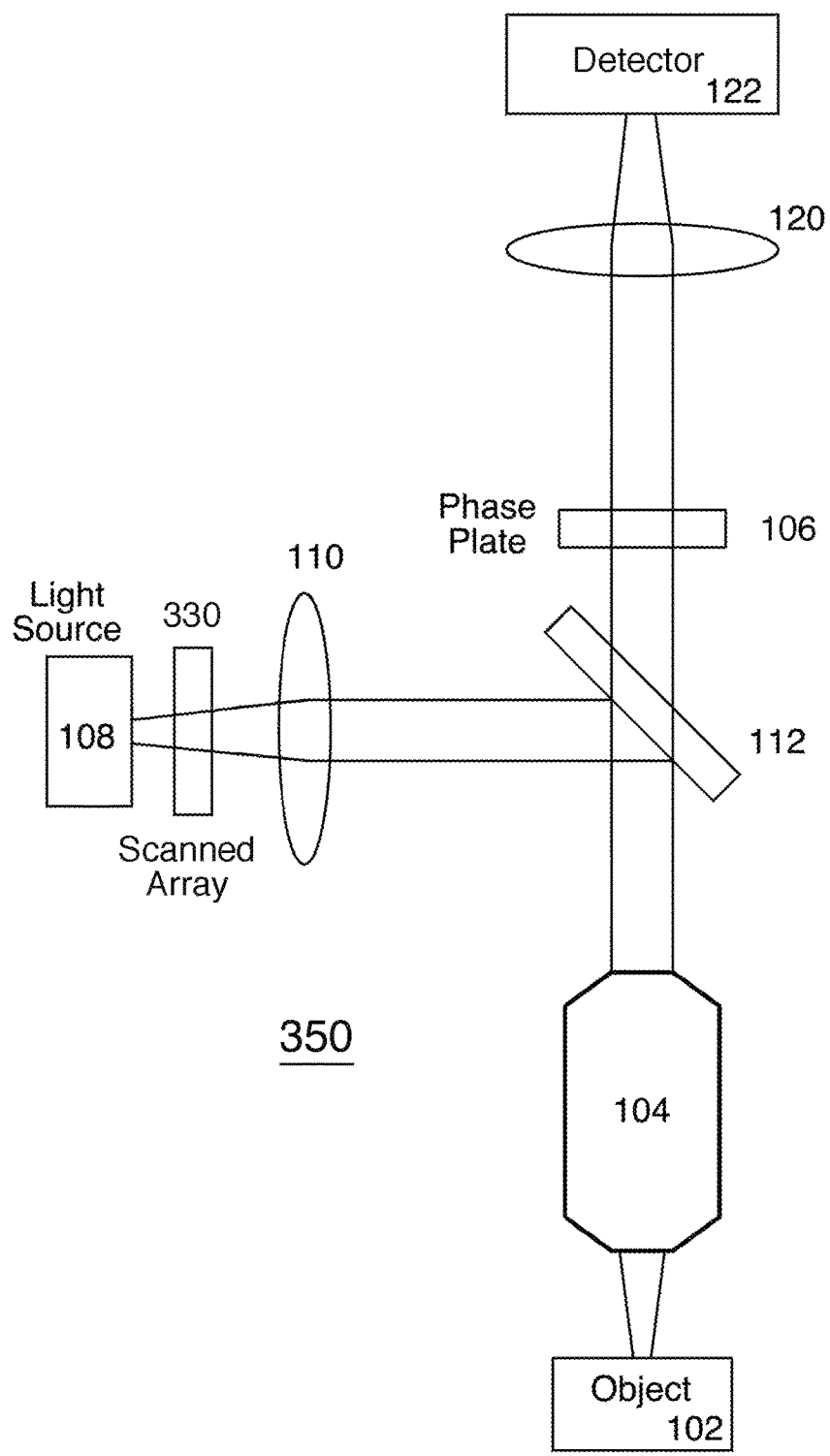
FIG. 3B is a schematic block diagram illustrating a microscope with scanned illumination for encoded PSF identification to accomplish depth map 3D imaging according to the present invention.

FIG. 3B is a schematic block diagram illustrating an embodiment of scanned imaging microscope 350 according to the present invention. It has features in common with EPIC microscope 200 of FIG. 2A and Light Field microscope 300 of FIG. 3A. As shown here, it includes a phase plate 106 similar to that of EPIC microscope 200, since microscope 350 is being used for encoded PSF identification and imaging. It also includes a scanned array element 330.

Figure 4A:
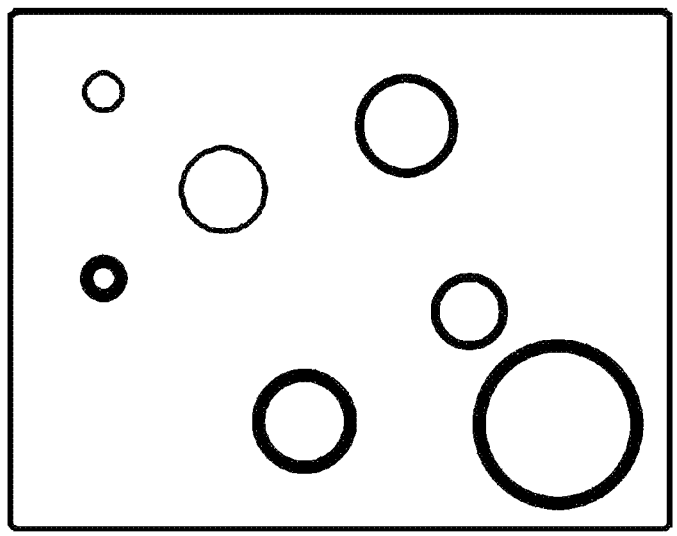
FIG. 4A is a diagram showing ringed PSF images at a first illumination position.
Figure 4B:
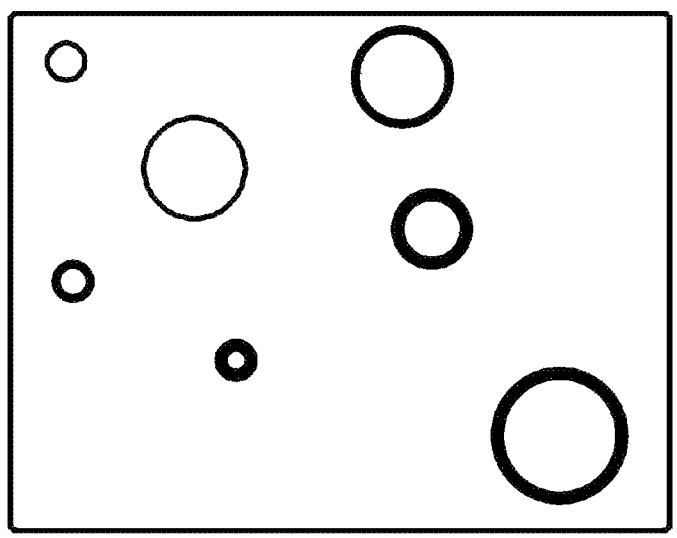
FIG. 4B is a diagram showing ringed PSF images at a second illumination position.
Figure 4C:
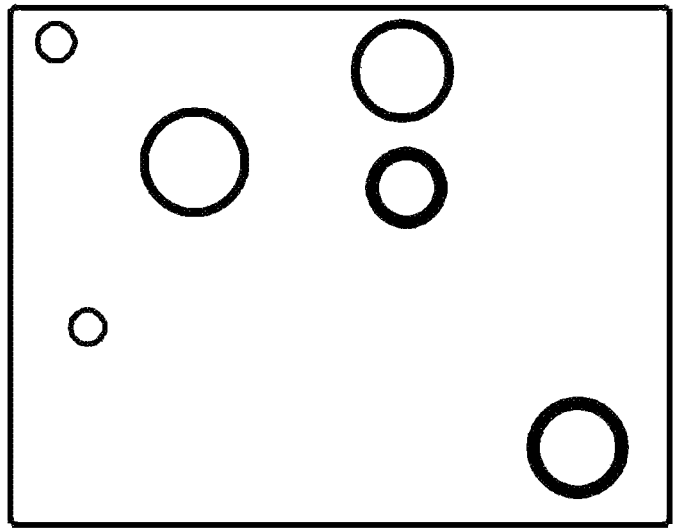
FIG. 4C is a diagram showing ringed PSF images at a third illumination position.
Figure 6:
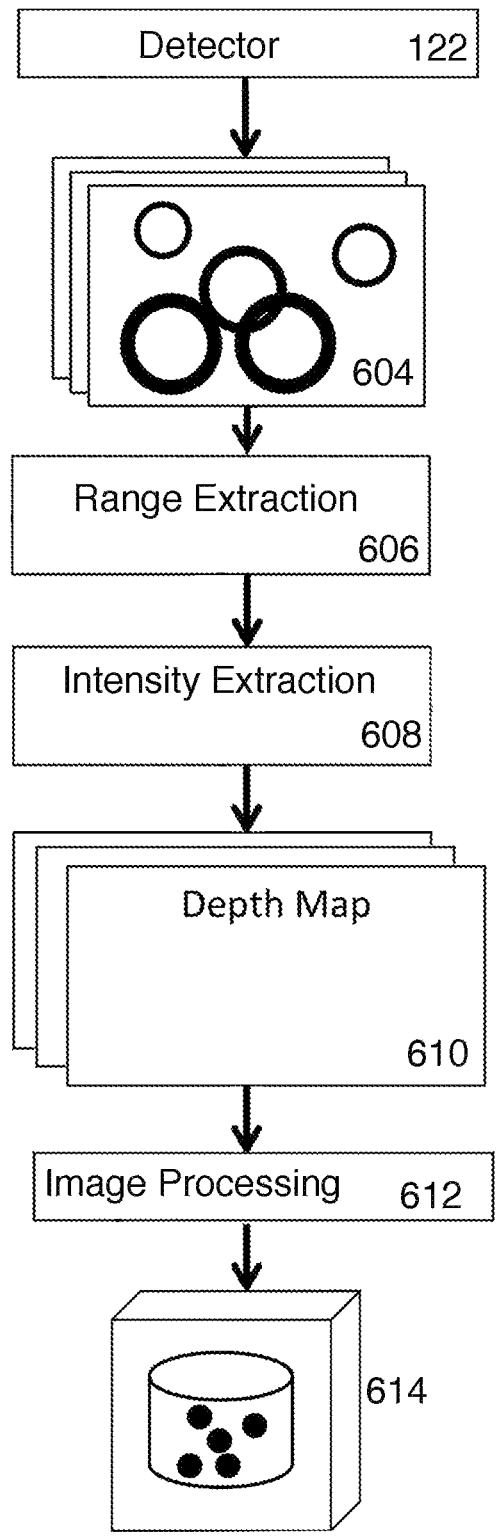
FIG. 6 is a flow diagram illustrating the imaging and processing steps accomplished by an embodiment of the present invention particularly useful for encoded PSF identification and imaging.

In the embodiment of FIG. 3B, a wide field microscope 350 is configured to use scanned illumination (for example by moving an array 330 in front of light source 108) to scan an extended object 102. It uses a specially designed mask 106 such as a phase plate for encoding images. Thus multiple encoded images are generated over the scan. These images are decoded and combined to form a depth map image as shown in FIG. 6. Scanned illumination is provided, for example, by moving (or scanning) an array 330 in front of illumination 108. This results in one or more spots within the extended object being illuminated at each recorded image time point, such that multiple images are formed at detector 122 overtime. Phase plate 106 (generally located at the back aperture plane of the objective) encodes the images. A series of encoded images such as those shown in FIG. 4A-4C are formed and recorded by detector 122. Detector 122 is generally also pixelated.

An example of a phase plate 106 shape that is used in the present invention is of the form shown in FIG. 7 and discussed further below, called a circular caustic (CC). When placed near the back aperture of the objective, it alters the objective's PSF in such a way that more information can be encoded in the microscope images (and then retrieved with computer processing).

FIG. 4A is a diagram showing ringed PSF images at a first illumination position. FIG. 4B is a diagram showing ringed PSF images at a second illumination position. FIG. 4C is a diagram showing ringed PSF images at a third illumination position. The time dithered illumination pattern (created by scanning a patterned array such as the example shown in FIG. 8 in front of the illumination) creates shifting ring PSF images at high speed. Each ring corresponds to one precise point on (for example) a biological cell, and its diameter encodes depth localization (or super-localization) information. After digital signal processing, the information in the images is combined to produce a 3D representation of the original object. In this example, phase plate 106 forms a ring for each point in the object, wherein the size of the ring is related to the depth position of the object feature in the 3D volume and the intensity of the ring is related to the intensity of the feature. Many other encoding schemes may be used.

FIG. 5 is a flow diagram illustrating the imaging and processing steps accomplished by an embodiment of the present invention particularly useful for Light Field imaging, such as microscope 300 in FIG. 3A. An object 102 is illuminated by scanned illumination as shown in FIG. 3A. Pixelated detector 322 images at or near the objective exit pupil. This generates multiple images 504. Images 504 generally comprise multiple images of the exit pupil's illumination—one image for each point in the scan of the object. This information is sufficient to determine the Light Field from the object.

The Light Field information can be used to generate 506 an in-focus image of the object at any desired focal depth. A number of focal depth plane images 508 can thus be created to cover the entire extent of the object's depth. These focal plane images may then be combined in step 510 to create a 3-dimensional image of the entire object.

Thus, step 510 combines the imagery from step 508 to produce a Light Field image 512 of object 102.

FIG. 6 is a flow diagram illustrating the imaging and processing steps accomplished by an embodiment of the present invention particularly useful for encoded PSF identification and imaging, such as microscope 350 of FIG. 3B. An object 102 is illuminated by scanned illumination (such as an array of spots or beams), and imaged via phase plate 106 by detector 122. This generates multiple encoded images 604 whose PSFs (such as rings) are sufficiently separated to be measured by the subsequent algorithm steps. Step 606 extracts range from encoded images 604, and step 608 extracts intensity. The range and intensity data are combined to form depth map 610. By also using the known position of the illuminating spots or beams to provide the lateral position of each object feature, Step 612 combines the decoded imagery to produce a 3D volume rendering or animation 614.

Embodiments might include:

1) For ring PSFs, the depth information is determined by measuring the diameter of each ring, and the intensity by the total energy in the ring image.

2) For the rotating PSFs, the depth information is determined by the orientation of the rotation and the intensity likewise by the total energy in the rotated PSF.

3) For any generic PSF which varies with defocus, the depth (defocus) can be determined by comparing the PSF image to a library of PSF images, each from a different amount of defocus. The intensity of the detected spot can likewise be deduced from the total energy of the detected PSF compared to a table of energy vs. spot intensity values for that specific defocus depth.

This method can even be used with a normal diffraction-limited PSF to achieve at least some 3D imaging extent.

FIG. 7 is a diagram of an example phase plate 106 according to the present invention. In this embodiment, phase plate 106 comprises a circular caustic shape and produces the through focus PSFs similar to those shown in FIGS. 4A-4C. When placed near the back aperture of the objective, it alters the objective's PSF in such a way that more information can be encoded in the microscope images (and then retrieved with computer processing).

The surface formula of this embodiment of a circular caustic is:

$$S=-4.36\times10^{-3}r^7+8.43\times10^{-3}r^6-6.8\times10^{-3}r^5-4.43\times10^{-3}r^4+0.0126r^3-0.230r^2+0.301r$$

This is the shape of one side of the phase plate. The phase plate itself is generally a disk of some optical material (the formula was developed assuming acrylic) with an arbitrary thickness and diameter. Current examples are about ½ mm thick and 10 mm diameter. One side of the plate is a plane and the other is determined by the formula. This represents the plate shown in the figure. The thickness is determined by the above formula according to the following rules:

S is the thickness difference of the plate (in mm) at a normalized radius, r, from the center of the plate. (Note that S=0, when r=0, e.g. at the center of the plate)

r is the normalized radius coordinate on the plate. r goes from 0 at at the center to 1 at the edge of the plate. For current plates, with a 10 mm diameter, the normalized parameter is calculated by r=R/5, where R is the actual radial position (in mm) on the real plate.

The sag, S, has the same magnitude regardless of the diameter of the phase plate. This is deliberate, as the actual magnitude of S determines the effect for a given defocus which is mostly independent of the diameter of the exit pupil.

Figure 8:
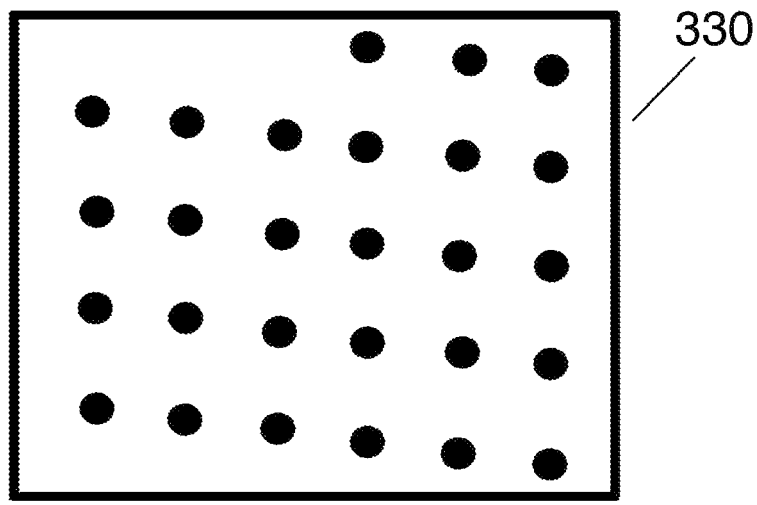
FIG. 8 is a patterned array for dithered illumination.

FIG. 8 is an example of a patterned array mask 330 for dithered illumination. It may comprise a mask with a pattern of holes, or a patterned array of micrometer-scale lenses, or a pixelated spatial light modulator, or similar. As an example, time dithered illumination might comprise mask 330 with a patterned array of holes and an x-y piezo scanning stage (not shown). In use, the stage moves mask 330 (or alternatively it moves the object 102) while imaging occurs. This illuminates different areas of the object at different experimental time points. As an alternative, optical tip/tilt mirror deflection may be used for scanning. It is also possible to use traditional single illumination point scanning, though this is a slower process.

Using scanned illumination is a major advance. It represents a quantum leap in the ability to solve a critical problem—that of how to extract the super-localized depth position information from the ring PSF image when observing complex, densely-labeled cell features. A patterned array mask 330 permits much faster acquisition speed. When the ring PSFs are reasonably spaced (e.g. their centers are a few pixels apart), then algorithms such as the circular Hough transform can be employed to measure their diameters very precisely and yield super-localization depth information. However, in order to image more complex biological objects in real-time 3D, new methods were required for reliably separating the densely packed ring structures from the recorded image and accurately measuring their diameters. The present invention illuminates each point in the specimen separately from its neighbors, and records its distinct PSF ring diameter without any ambiguity arising from adjacent points on the object. Using mask 330 allows many spots on the sample to be illuminated and imaged at the same time, in a single camera frame, as a small number of pixels separate the centers of each PSF ring so they can be readily differentiated. Therefore, patterned illumination array 330 achieves the necessary separation of the ring PSFs for accurate depth localization of each cell feature while maintaining the required acquisition speed.

As an alternative, if only a single point is scanned rather than an array of points, an array of detectors may be used in place of camera 216. The detector array measures the diameter and intensity of each PSF ring as the system scans. For example, high speed galvo mirrors could be used to scan a single illumination spot in a raster pattern across the sample.

While the exemplary preferred embodiments of the present invention are described herein with particularity, those skilled in the art will appreciate various changes, additions, and applications other than those specifically mentioned, which are within the spirit of this invention. For example, this technology can be broadened to include other optical imaging systems including machine vision for such purposes as robots in warehouses, games controllers, UPS codes and box size and shape detection for shipping, and endoscopes.

What is claimed is:

1. Apparatus for capturing a Light Field of an object comprising:
   a scanning device for sequentially illuminating points of the object;
   an optic for focusing light from the object;
   a detector having an array of pixels for forming a series of multi-pixel images of a focal plane near the exit pupil of the optic, each multipixel image based on an illuminated point;
   a storage device for storing the series of multi-pixel images further including a processor configured to generate focal-plane images at various depths of focus based upon the series of multi-pixel images;
   wherein the processor is further configured to combine the focal-plane images and form a Light Field image of the object; wherein the scanning device includes an array of elements for illuminating multiple spaced-apart points on the object at the same time.

2. The apparatus of claim 1 further wherein the detector includes a 2-Dimensional array of at least about 5×5 pixels.

3. The apparatus of claim 2 wherein the detector includes a 2-Dimensional array of at least about 10×10 pixels.

4. The apparatus of claim 1 wherein the array of elements comprises one of the following:
   a mask with holes;
   a pixelated liquid crystal spatial light modulator;
   a digital light processor;
   an array of deformable mirrors.

5. A method of identifying encoded information representing an object comprising the steps of:
   (a) sequentially illuminating points of the object;
   (b) focusing light from the object with an optic;
   (c) imaging near the exit pupil of the optic to form a series of multipixel images during step (a), each multipixel image based on an illuminated point; and
   (d) storing the series of multipixel images further comprising the steps of: (e) generating focal-plane images at various depth of focus within the object based upon the series of images stored in step (d); (f) combining the focal-plane images to form a Light Field of the object; wherein step (a) illuminates a plurality of separated points of the object at a time.

* * * * *